Nov. 5, 1935.  G. W. ALLEN  2,020,092
MOTOR MOUNTING
Filed July 5, 1934
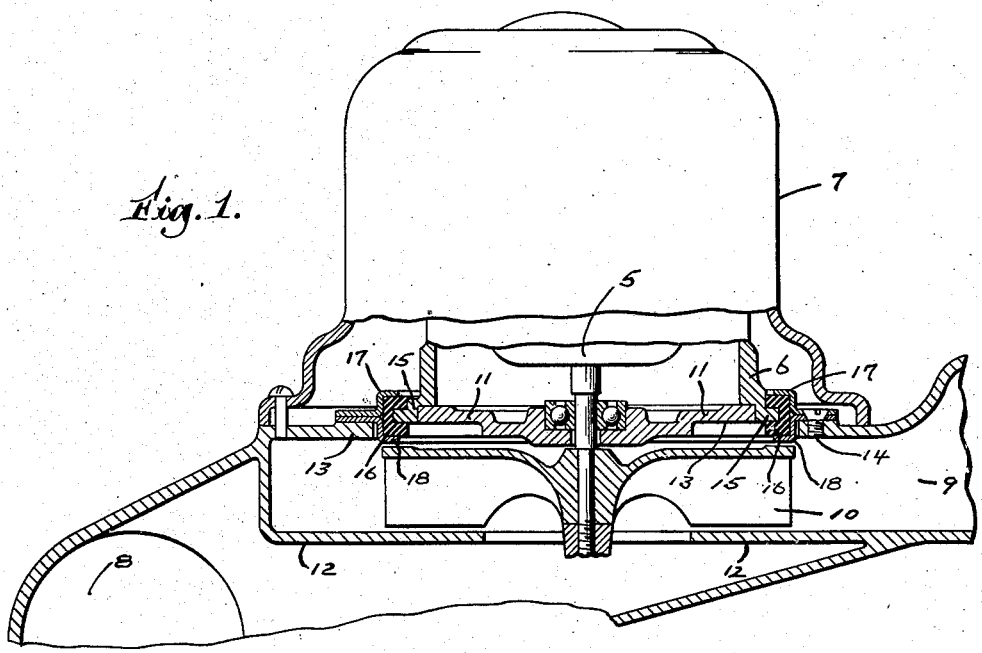
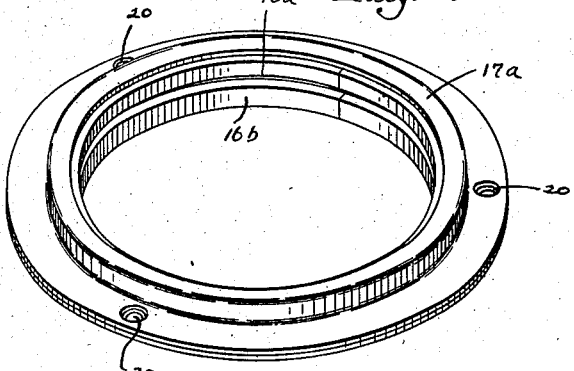
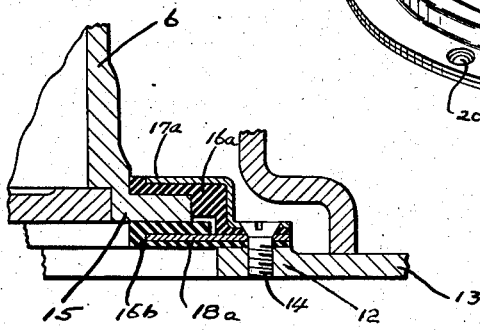
Inventor
GEORGE W. ALLEN
by Robert T. Palmer
Attorney Patented Nov. 5, 1935

2,020,092

UNITED STATES PATENT OFFICE 2,020,092

MOTOR MOUNTING

George W. Allen, Hyde Park, Mass., assignor to B. F. Sturtevant Company, Inc., Boston, Mass.

Application July 5, 1934, Serial No. 733,790

2 Claims. (Cl. 248—26)

This invention relates to vibration absorbing mountings for motors and relates more particularly to vibration absorbing mountings for resiliently securing the motor housing of a vacuum sweeper to an associated fan housing.

The ordinary small vacuum sweeper contains an electric motor which is rotated at very high speeds so as to insure adequate sweeper suction. It is usual to construct the motor housing, the motor cover, the fan housing, the nozzle, and the discharge duct of metal to insure adequate strength. Where metal to metal contact occurs, the noise of the high speed motor is transmitted to the metal housing and supporting structure which are set into vibration, and when this occurs, the sweeper is relatively noisy.

It has been proposed in the past to mount the motor housing of an electric vacuum sweeper on one or more rubber absorbing members. One type of mounting which was tried was a flat annular ring which was inserted between the motor housing and the base to which the motor housing was attached. This was found to be unsatisfactory due to the fact that the movement of the motor housing away from its base was not restrained by this type of rubber mounting.

Another type of mounting which has been proposed was the provision of several cylindrical rubber insulating members which were arranged circumferentially around the base of the motor housing and which spaced the motor housing from its base, which base ordinarily is the associated fan housing. Such mountings were relatively expensive, requiring frequent adjustment, and were not entirely satisfactory.

According to this invention, the lower portion of the motor housing is provided with an annular flange. On each side of this flange is provided rubber absorbing means which may be in the form of a single annular ring having a central groove provided to receive and fit firmly against both sides of the annular flange, or may be in the form of two annular rubber rings, one of which is in contact with each side of said flange. Associated with the annular ring or rings, is a pair of cooperating metal clamping rings, each of which has one end in contact with the rubber mounting and each of which has its other end extending over or overlapping the flange on the fan housing of the sweeper, the overlapping portions being drilled to receive several screws which pass through the drilled openings into tapped openings in the flange on the fan housing. When the screws are placed in position and screwed into the flange on the fan housing, the clamping rings are drawn together to clamp the rubber mounting against both sides of the annular flange on the motor housing and to secure the motor housing to the fan housing.

With the resilient rubber mounting, according to this invention, the motor housing is completely insulated from the fan housing by means of the rubber mounting, which not only extends between the fan housing and the motor housing to absorb downward vibrations of the motor housing, but an equal amount of rubber is placed above the flange on the motor housing to absorb upwardly extending vibrations of the motor housing and sufficient rubber extends around the flange to assist in absorbing cross vibrations; thus, regardless of the direction of movement of the motor housing, this movement is restrained by the rubber mounting and all vibrations in all directions are completely absorbed.

An object of the invention is to prevent the transmission of vibrations from the motor housing to its base.

Another object of the invention is to provide an adequate and inexpensive resilient mounting for the motor housing of an electric vacuum sweeper.

Other objects of the invention will be apparent from the following description taken together with the drawing.

The invention will now be described with reference to the drawing, of which:

Fig. 1 is a partial side view, partially in section of the motor, fan, nozzle, and discharge assembly of an electric vacuum sweeper.

Fig. 2 is a projected view of a rubber mounting with associated clamping rings, which is the equivalent of and which may be substituted for the resilient mounting shown by Fig. 1, and Fig. 3 is a sectional view, showing the rubber mounting of Fig. 2 substituted for the rubber mounting of Fig. 1 in contact with flanges on the motor and fan housing of the assembly of the vacuum sweeper of Fig. 1.

Referring now to Fig. 1, the electric vacuum sweeper there partially illustrated, comprises the motor 5, the motor housing 6, the motor cover 7, the nozzle 8, the discharge 9, the fan or runner 10, the motor bearing support 11, and the fan housing 12.

The fan housing 12 is provided with the inwardly extending annular ring 13, which has a flattened upper portion, which is fitted with a plurality of tapped openings to receive the assembly screws 14.

The lower portion of the motor housing 6 is provided with an outwardly extending annular flange 15 on the motor housing. The annular flange 15 of the motor housing and the annular flange 13 of the fan housing are supported to each other as will now be described.

Extending completely around the annular flange 15 and having a central portion cut out to receive the flange and having upper and lower portions in contact with the upper and lower portions of the flange, is the rubber mounting ring 16. Associated with the rubber mounting ring 16 are the upper clamping ring 17 and the lower clamping ring 18. These clamping rings 17 and 18 are each bent as shown by Fig. 1 to have a step portion and a base portion, the step portion of the ring 17 extending above and in contact with the rubber mounting ring 16, and the step portion of the clamping ring 18 extending below and in contact with the lower portion of the mounting ring. Base portions of the clamping ring 17 and 18 are in contact with each other and overlap, and are in contact with the flat upper surface of the inwardly extending annular flange 13 of the fan housing. The base portions of the clamping rings are drilled at a plurality of spaced points around their circumference to receive the screws 14 which, when tightened, not only serve to draw the clamping rings 17 and 18 together and in contact with the rubber ring 18, but to clamp the rubber ring 18 against the annular flange 15 on the motor housing, and to attach the base portions of the clamping rings 17 and 18 together and to the flange 13 on the fan housing and thus attach the motor housing 6 to the fan housing 12 through the intermediary of the resilient mounting provided by the rubber ring 16.

The resilient mounting illustrated by Fig. 2 and Fig. 3 illustrates a resilient mounting which is the equivalent of that described in connection with Fig. 1 but it is believed to be less desirable because the rubber mounting is supplied in two portions, each of which is vulcanized to one of the pair of metal clamping rings.

Referring now to Figs. 2 and 3, the rubber mounting is provided in two portions, an upper portion 16a and a lower portion 16b. Vulcanized to the lower rubber clamping member 16b is the lower metal clamping ring 18a.

As in Fig. 1, the rubber mounting extends above and below and in close contact with the annular ring 15 on the motor housing 6, and the base portions of the metal clamping rings 17a and 18a overlap the annular flange 13 of the fan housing and is drilled at a plurality of points 20 to receive the screws 14.

As in the mounting illustrated by Fig. 1 and previously described, when the screws 14 are screwed tightly into the flange 13 on the fan housing, the metal clamping rings 17a and 18a are not only drawn together but clamp the rubber mounting against both sides of the annular flange 15, and the motor housing 6 is securely attached to the fan housing 12 through the intermediary of the resilient mounting.

While the invention has been described in connection with vacuum sweepers, it should be understood that it is capable of other applications. The annular flange 13 on the fan housing to which the motor housing is resiliently supported, may be termed the base of a motor assembly to which the motor is resiliently supported.

While the invention has been described as employing one or more rubber vibration absorbing rings, it should be understood that cork, synthetic rubber, or any other equivalent substance may be used in lieu of rubber.

While several embodiments of the invention have been described for the purpose of illustration, it should be understood that the invention should not be limited to the precise arrangements described, since many modifications and departures may be made by those skilled in the art without departing from the spirit of the invention.

What is claimed is:

1. A vacuum sweeper essembly comprising an upper motor housing, a lower fan housing having an upper central opening for the reception of the fan, an outwardly extending flange around said motor housing adjacent the base thereof, an inwardly extending flange around said fan housing extending towards but terminating short of said flange on said motor housing adjacent the base thereof, resilient vibration absorbing means in contact with both sides of said flange on said motor housing, a pair of clamping rings, one in contact with said absorbing means on each side of said flange around said motor housing, and means for drawing said rings together so as to clamp said absorbing means against the flange of said motor housing and for securing said rings to said flange of said fan housing, said absorbing means and said rings serving with said base of said motor housing to close off said upper opening in said fan housing and to connect with said flange of said fan housing to form a continuous upper wall for said fan housing.

2. A vacuum sweeper assembly comprising an upper motor housing, a lower fan housing having an upper central opening for the reception of the fan, an outwardly extending flange around said motor housing adjacent the base thereof, an inwardly extending flange around said fan housing extending towards but terminating short of and arranged a relatively small distance below said flange on said motor housing adjacent the base thereof, resilient vibration absorbing means in contact with both sides of said flange on said motor housing, a pair of clamping rings, one in contact with said absorbing means on each side of said flange around said motor housing, and means for drawing said rings together so as to clamp said absorbing means against the flange of said motor housing and for securing said rings to said flange of said fan housing, said absorbing means and said rings serving with said base of said motor housing to close off said upper opening in said fan housing and to connect with said flange of said fan housing to form a continuous upper wall for said fan housing.

GEORGE W. ALLEN.